Patented June 3, 1947

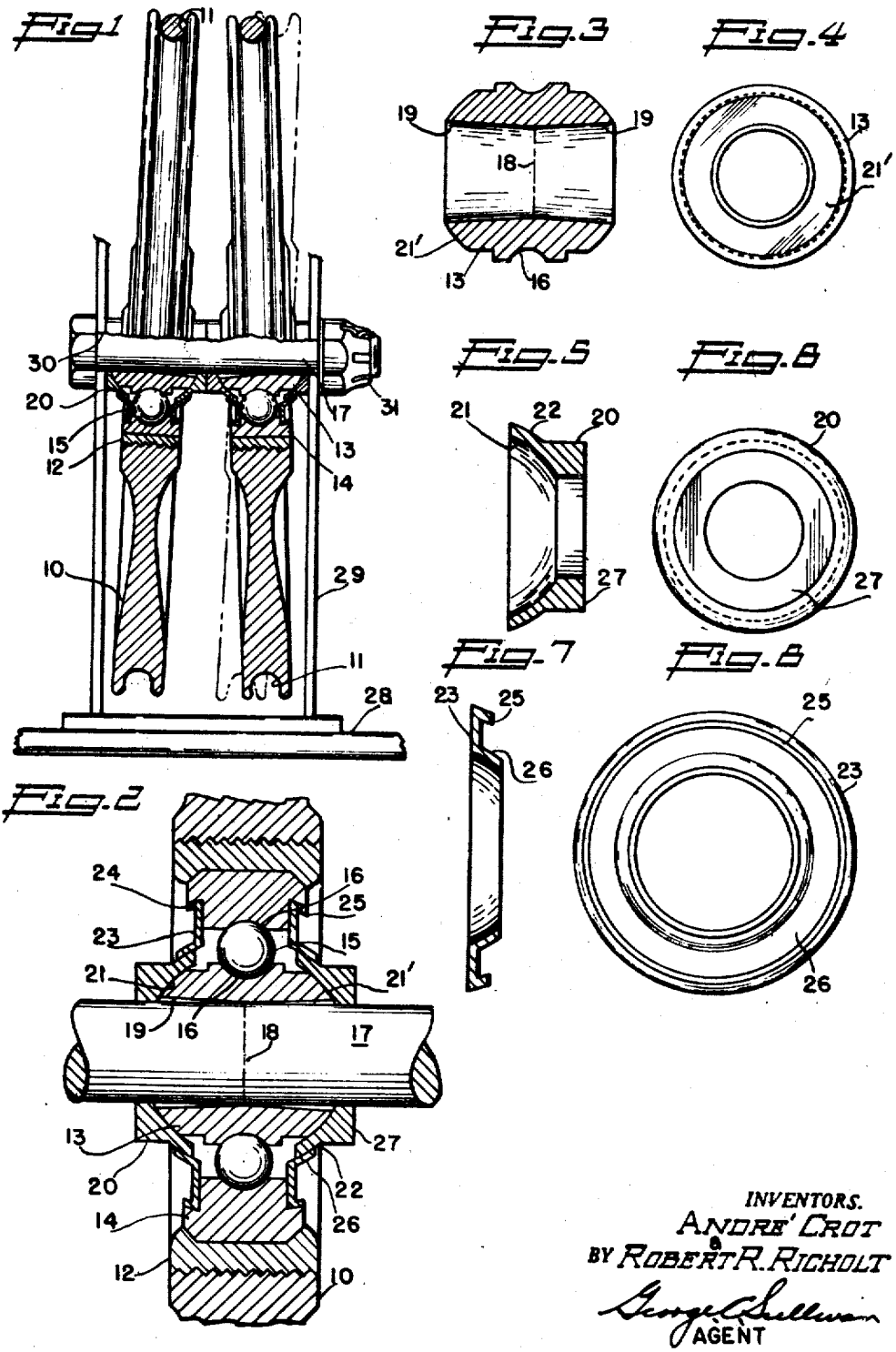

2,421,685

UNITED STATES PATENT OFFICE 2,421,685

ALIGNABLE PULLEY

André Crot, North Hollywood, and Robert R. Richolt, Tujunga, Calif., assignors to Lockheed Aircraft Corporation, Burbank, Calif.

Application July 26, 1944, Serial No. 546,685

9 Claims. (Cl. 308—181)

This invention relates to pulleys, and relates more particularly to adjustable or alignable pulleys.

In the control systems of aircraft and in other installations where cables operate over pulleys, the proper alignment of the pulleys has always constituted a problem. Where the pulleys have fixed mountings or bearings, it is difficult to obtain the correct alignment between the axes of rotation of the pulleys and the planes of operation of the cables. Any appreciable misalignment results in excessive friction in the system and wear of the cables and pulleys, and often necessitates removal and re-setting of the pulleys. Alignable pulleys have been suggested to overcome this difficulty, but they have had certain disadvantages which preclude their acceptance by the industry. The alignable pulleys that have heretofore been suggested are not entirely self-contained, but embody loose or separate parts which require assembling at the time the pulleys are installed. Where a multiplicity of pulleys is to be arranged in a gang or group, it is often impossible to assemble these loose parts of the individual pulleys. Furthermore, the prior alignable pulleys are subject to vibrating loose by reason of the limited areas of contact between the parts which are depended upon to maintain the required alignment.

It is a general object of the present invention to provide a simple, practical and thoroughly dependable alignable pulley. The pulley of the invention is easily aligned with respect to its cable, subsequent to its installation, and where a plurality of the pulleys has been installed in a gang on a single mounting shaft or bolt the pulleys may be readily adjusted individually to be in correct alignment with their respective cables.

Another and important object of the invention is to provide an alignable pulley of the class above referred to that is entirely self-contained to be conveniently handled and installed as a unit with no separate or loose parts necessitating individual handling and installing. The pulley of the invention embodies an anti-friction bearing and clamp washer assembly whose several elements are all retained together on the pulley so that there is but one unit to assemble on the supporting shaft or bolt. The unitary nature of the pulleys materially simplifies their installation, particularly where they are mounted in gangs or groups. The manufacturer of the pulley assembles all of the parts into one assembly which remains a single unit during packaging, transporting and installing in its final operative position.

Another object of the invention is to provide an alignable pulley of the character referred to in which the anti-friction bearing remains sealed at all times to retain lubricant, and to prevent the entrance of foreign matter. The pulley is characterized by retaining rings which hold the clamping washers in the assembled relation and also shield and seal the bearing.

Another object of the invention is to provide an alignable pulley in which the cooperating clamping parts for holding the pulley in its aligned position, present extensive areas of contact to effectively resist shifting of the pulley from its proper aligned position even when subject to heavy vibration.

Another object of the invention is to provide an alignable pulley in which the bearing assembly and the mounting hub constitute a compact assemblage and present plain flat end surfaces suitable for engagement with the corresponding surfaces of adjacent pulleys or the surfaces of the mounting brackets.

A further object of the invention is to provide an alignable pulley that is simple and inexpensive to manufacture, embodying a relatively few simple parts.

Other objects and advantages of the invention will become apparent from the following detailed description of a typical preferred embodiment wherein reference will be made to the accompanying drawings in which:

Figure 1 is an elevation view of a pair of pulleys of the invention mounted in a suitable bracket, with portions of the pulleys broken away to appear in vertical cross section;

Figure 2 is an enlarged fragmentary detailed sectional view of the hub and bearing portion of one of the pulleys;

Figure 3 is a longitudinal sectional view of the inner bearing member;

Figure 4 is an end view of the bearing member;

Figure 5 is a longitudinal section of one of the hub washers;

Figure 6 is an end view of the washer;

Figure 7 is a longitudinal section of one of the retaining rings; and,

Figure 8 is an end elevation of the retaining ring.

The pulley of the invention comprises a rim or body 10 having a groove 11 in its periphery for the reception of the cable. The construction, material and configuration of the pulley body 10 may vary considerably in different applications. In the present case it may be assumed that the body 10 is a one-piece member constructed of Bakelite, plastic or a similar composition. The material of the pulley body 10 may be directly bonded with the knurled or roughened external surface of a bushing 12. We have shown the body reduced in thickness between its rim and hub portions to lessen the weight. The body 10 may be slightly increased in thickness around the bushing 12.

The hub of the pulley preferably embodies an anti-friction bearing means to insure free running of the pulley. The bearing means comprises inner and outer race members 13 and 14, and one or more series of balls 15 engaged between the race members. The race members are annular elements concentric with the axis of rotation of the pulley. The race member 14 is fitted within the bushing 12 and the bushing has rims or lips spun over the corners of the race member to secure the member to the pulley. The outer member 14 is spaced around the inner member 13 and the spaced opposing surfaces of the members have race grooves 16 for receiving the series of balls 15. In the typical construction illustrated, there is a single series of balls, it being understood that in other cases two or more rows of balls may be employed. The engagement of the balls 15 in the raceways 16 effectively holds the bearing members 13 and 14 against relative axial movement and assures the transmission of both radial and axial loads with a minimum of friction. It will be seen that the ball bearing just described supports the pulley for free rotation on its inner race member 13.

The longitudinal opening of the inner member 13 receives the shaft or bolt 17 of the pulley bracket. The opening flares or tapers from a central line or plane 18 to its opposite ends to permit angular movement or tilting of the pulley with respect to the bolt 17. The degree or angularity of the taper given the walls 19 of the opening may vary in different applications of the invention. The intermediate area or zone 18 of the opening in the bearing member 13 rather accurately receives the bolt 17 and forms an annular fulcrum about which the member may be tilted to align the pulley with its cable. It will be observed that the outer bearing member 14 and the pulley body 10 tilt or move with the inner member 13 during the adjustment. In other words, the bearing members 13 and 14 and the body 10 are tiltable as a unit to bring the pulley into correct alignment with the related cable. The extent or range of the angular alignment may be limited by the angularity or taper of the walls 19.

The pulley further includes hub washers 20 for retaining or clamping the pulley in its aligned position. A washer 20 is arranged at each end of the inner bearing member 13, and the washers and member have cooperating spherically curved surfaces 21 and 21'. The end surfaces 21' of the bearing member 13 are convex and spherically curved about a central point in the transverse plane 18 of the member. The inner surfaces 21 of the washers 20 are concave and spherically curved to conform to the end faces of the member 13. The openings in the washers 20 are proportioned to receive the bolt 17 with suitable clearance, being smaller in diameter than the extremities of the opening in the hub member 13. When the hub assembly is clamped or subjected to axial compression following alignment of the pulley, the spherically curved surfaces 21 and 21' cooperate to retain the pulley in the adjusted position. It is a feature of the invention that the inner bearing member 13 and the washers 20 are constructed and related to have cooperating surfaces 21 and 21' of considerable area to insure the positive retention of the pulley in its final aligned position.

In accordance with the present invention, means are provided to retain the above described parts assembled in one unit for convenient handling and installation, which means further serves to shield and seal the anti-friction bearing. These means include annular skirts 22 extending from the inner ends of the washers 20 toward the series of balls 15. The inner surfaces of the skirts 22 constitute continuations of the spherically curved concave surfaces 21 of the washers 20 and the outer surfaces of the skirts are convex and spherically curved to be concentric with the surfaces 21. The skirts 22 are preferably integral with their respective washers 20 and may be of sufficient extent to overlie substantial end portions of the hub or bearing member 13.

The means for retaining the washers 20 in the assembled relation and for shielding the anti-friction bearing further include shields or retaining rings 23 associated with the outer bearing member 14. The retaining rings 23 are applied to the opposite ends of the member 13 to flatly bear against the same. Undercut annular shoulders 24 are formed on the ends of the member 14 and face inwardly or toward the inner bearing member 13. Rims 25 are provided on the retaining rings 23 to lock under the shoulders 24. The rims 25 are sloped or pitched to conform to the undercut shoulders 24 and their engagement with the shoulders dependably secures the rings 23 to the member 14. The retaining rings 23 are forced or pressed into the positions where their rims 25 lock under the shoulders 24, the rings being permanently fixed to the bearing member 14 by this locking engagement. The retaining rings 23 are further provided with flanges or skirts 26 for cooperation with the skirts 22 of the adjacent washers 20. The skirts 26 project from their respective rings 23 to overlap the skirts 22 and are spherically curved to conform thereto. The cooperating surfaces of the skirts 22 and 26 may be machined to have accurate engagement to prevent the escape of lubricant from the anti-friction bearing.

In assembling the pulley, the anti-friction bearing may be packed or supplied with a selected lubricant, and the washers 20 are arranged in position against the ends of the hub member 13. The retaining rings 23 are then secured to the opposite ends of the bearing member 14 as above described, so that their skirts 26 engage with the skirts 22 of the washers. The cooperation of the skirts 26 and 22 dependably retains the washers at the ends of the hub member 13, yet allows relative rocking or tilting movement between the pulley and the washers. Thus the washers are permanently assembled on the pulley in such a manner as to allow alignment of the pulley with the respective cable subsequent to its mounting on the bolt 17. The outer parts of the washers 20 are preferably thickened to present flat end faces 72 normal to the longitudinal axis of the bolt 17. These flat faces 27 are adapted to cooperate with the corresponding faces of adjacent pulleys and with the surfaces of the mounting bracket, as will be later described.

The pulley of the invention described above may be mounted in any selected or required type of support or mounting bracket, individually or together with other pulleys. The fact that the pulleys are each permanently assembled in a single unit, well suits them for installation in situations where the pulleys occur in gangs or groups. In the typical case illustrated in Figure 1 of the drawing, there is a pair of the pulleys mounted in a more or less typical bracket. The bracket has an attaching base 28 and two spaced outstanding arms 29. The arms 29 have aligned openings 30 receiving the pulley supporting bolt 17. In mounting the pulleys, they are first positioned between the bracket arms 29 and the bolt 17 is passed through the openings 30 and the tubular hub members 13. Assuming that the bracket has been installed in its final position, the cables to be operated over the pulleys may be rigged and engaged in the grooves 11 of their respective pulleys. The pulleys may be tentatively aligned with respect to their cables and tension is then applied to the cables. With the tension maintained on the cables, the pulleys are readily aligned individually by merely manually tilting or rocking them to their correct positions with respect to their cables. As above described, the flared or tapered walls 19 of the openings in the hub members 13 allow this tilting of the pulleys. When the pulleys have been brought into correct alignment with their cables, the bolt 17 is tightened by screwing up its nut 31. This tightening of the bolt 17 securely clamps the pulleys in the correctly aligned positions, the washers 20 being clamped against the ends of the hub members 13. The extensive cooperating surfaces 21 and 21' of the members 13 and their washers 20 assure the positive retention of the pulleys in alignment with their cables. It will be observed that the hub members 13 and the washers 20 space the pulleys from the bracket arms 29 and from one another so that their rims do not interfere or engage the bracket.

Thus it will be seen that we have provided alignable pulleys that may be easily mounted and aligned with their cables. There are no separate or loose parts to complicate the installation operations and little or no possibility of the pulleys becoming displaced or shifted from their properly aligned positions. The pulleys may be constructed to be light in weight and yet capable of assuming heavy loading and are therefore well adapted for use in aircraft.

Having described only a typical form of the invention, we do not wish to be limited to the specific details herein set forth, but wish to reserve to ourselves any variations or modifications that may appear to those skilled in the art or fall within the scope of the following claims.

We claim:

1. A self-contained alignable pulley for arrangement on a support comprising a body, bearing means on the body capable of angular adjustment on the support, clamp members for acting on the bearing means to preserve the angular adjustment thereof, and retaining rings operatively securing the clamp members to the bearing means to form elements of the self-contained pulley.

2. A self-contained alignable pulley for arrangement on a support comprising the assembly of a body and bearing means on the body capable of angular adjustment on the support, members for clamping against the bearing means to maintain the angular adjustment thereof, and rings on the bearing means for retaining the members in position for operation and to form elements of the pulley assembly.

3. An alignable pulley for arrangement on a support comprising a pulley body, bearing means in the body including relatively rotatable inner and outer bearing members, the members being capable of angular adjustment on the support to allow alignment of the pulley, washer elements for clamping against the ends of the inner member to secure the pulley in the aligned position, and retainers on the outer member for retaining the washer elements in position at the ends of the inner member to constitute permanent parts of the pulley.

4. An alignable pulley for use on a support comprising a pulley body, bearing means on the body including a bearing member capable of angular movement on the support to allow angular movement of the pulley to a selected position, the member having spherically curved convex end surfaces, clamp washers having spherically curved concave surfaces for cooperating with the first named surfaces to hold the pulley in the selected angular position with respect to the support, and rings carried by the bearing means, the washers and rings having interfitting surfaces for retaining the washers on the pulley.

5. An alignable pulley for use on a support comprising a pulley body, bearing means on the body including a bearing member capable of angular movement on the support to allow alignment of the pulley, the member having spherically curved convex end surfaces, clamp washers having spherically curved concave surfaces for cooperating with the first named surfaces to hold the pulley in the selected angular position with respect to the support, rings on the bearing means, and inter-engaging spherically curved parts on the washers and rings for retaining the washers on the pulley assembly.

6. An alignable pulley for use on a support comprising a pulley body, bearing means on the body including inner and outer bearing members related for relative rotation and anti-friction elements engaged between the members, the inner member having an opening for receiving the support and flared from its intermediate zone to its ends whereby the pulley is capable of angular movement with respect to the support, the ends of the inner member being convex, clamp washers having concave surfaces for cooperating with the first named surfaces to hold the pulley in the selected position, and inter-fitting parts on the outer bearing member and washers for retaining the washers on the bearing means and for shielding the bearing means.

7. An alignable pulley for use on a support comprising a pulley body, bearing means on the body including inner and outer bearing members related for relative rotation and anti-friction elements engaged between the members, the inner member having an opening for receiving the support and flared from its intermediate zone to its ends whereby the pulley is capable of angular movement with respect to the support, the ends of the inner member being convex, clamp washers having concave surfaces for cooperating with the first named surfaces to hold the pulley in the selected position, spherically curved skirts on the washers, and spherically curved skirts on the inner member overlapping the first named skirts to retain the washers and to shield the bearing means.

8. An alignable pulley for arrangement on a shaft comprising a pulley body, bearing means secured in the body, the bearing means including a bearing member capable of angular adjustment on the shaft, parts for acting on the bearing member to preserve the angular adjustment of the member and pulley body, and retainers secured to the bearing means to be adjusted therewith upon angular adjustment of the member on the shaft and retaining said parts on the bearing means.

9. A self contained alignable pulley for arrangement on a shaft comprising the assembly of a pulley body, bearing means secured in the body and capable of angular adjustment on the support so that the pulley assembly may be adjusted with respect to the shaft, means for acting on the bearing means to maintain the adjustment of the assembly, and retaining elements secured to said assembly to be adjusted therewith and retaining the last named means on the said assembly to form permanent parts thereof.

ANDRÉ CROT.
     ROBERT R. RICHOLT.

REFERENCES CITED

The following references are of record in the file of this patent:

UNITED STATES PATENTS

| Number | Name | Date |
|---|---|---|
| 2,279,887 | Hathorn | Apr. 14, 1942 |
| 2,349,084 | Findley | May 16, 1944 |

FOREIGN PATENTS

| Number | Country | Date |
|---|---|---|
| 47,555 | Sweden | Oct. 5, 1918 |
| 675,386 | Germany | May 8, 1939 |